(12) United States Patent
Han et al.

(10) Patent No.: US 9,755,822 B2
(45) Date of Patent: Sep. 5, 2017

(54) COUNTERMEASURE TO POWER ANALYSIS ATTACKS THROUGH TIME-VARYING IMPEDANCE OF POWER DELIVERY NETWORKS

(71) Applicant: CRYPTOGRAPHY RESEARCH, INC., San Francisco, CA (US)

(72) Inventors: Minghui Han, San Jose, CA (US); Megan Wachs, San Francisco, CA (US); Hai Lan, Fremont, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 20 days.

(21) Appl. No.: 14/307,453

(22) Filed: Jun. 17, 2014

(65) Prior Publication Data
US 2015/0195082 A1  Jul. 9, 2015

Related U.S. Application Data

(60) Provisional application No. 61/837,008, filed on Jun. 19, 2013.

(51) Int. Cl.
*H04L 9/00* (2006.01)
*G06F 1/30* (2006.01)

(52) U.S. Cl.
CPC .............. *H04L 9/003* (2013.01); *G06F 1/30* (2013.01); *H04L 2209/12* (2013.01)

(58) Field of Classification Search
CPC ..... H04L 9/003; H04L 9/005; H04L 2209/12; H04L 9/002; H04L 9/004; G06F 1/30; G06F 1/28
See application file for complete search history.

(56) References Cited

U.S. PATENT DOCUMENTS

| | | | |
|---|---|---|---|
| 4,200,770 A | 4/1980 | Helman et al. | |
| 4,405,829 A | 9/1983 | Rivest et al. | |
| 4,759,063 A | 7/1988 | Chaum | |
| 4,905,176 A | 2/1990 | Schulz | |
| 4,908,038 A | 3/1990 | Matsumura et al. | |
| 5,401,950 A | 3/1995 | Yoshida | |
| 5,404,402 A | 4/1995 | Sprunk | |
| 5,539,827 A | 7/1996 | Liu | |

(Continued)

FOREIGN PATENT DOCUMENTS

EP    0660562 A2    6/1995

OTHER PUBLICATIONS

Clavier, et al., "Differential Power Analysis in the Presence of Hardware Countermeasures", Jan. 29, 2002, Cryptographic Hardware and Embedded Systems, CHES 2000, vol. 1965 of the series Lecture Notes in Computer Science, pp. 252-263.*

(Continued)

*Primary Examiner* — Eleni Shiferaw
*Assistant Examiner* — Nelson Giddins
(74) *Attorney, Agent, or Firm* — Lowenstein Sandler LLP (57) ABSTRACT

A method and system for a countermeasure to power analysis attacks, where an impedance element is coupled to a power source providing power to a cryptographic module causing a measurable power supply noise, a timing sequence is generated, and the impedance element is decoupled from the power source based on the timing sequence to cause the measurable power supply noise to vary according to the timing sequence.

20 Claims, 9 Drawing Sheets

(56) References Cited

U.S. PATENT DOCUMENTS

| | | | |
|---|---|---|---|
| 5,664,017 A | 9/1997 | Gressel et al. | |
| 5,995,629 A | 11/1999 | Reiner | |
| 6,041,122 A | 3/2000 | Graunke et al. | |
| 7,571,492 B2 | 8/2009 | Hubert | |
| 7,620,823 B2 | 11/2009 | Kim | |
| 8,365,310 B2 | 1/2013 | Shamir | |
| 2004/0025032 A1* | 2/2004 | Chow et al. | 713/189 |
| 2007/0180541 A1* | 8/2007 | Shu et al. | 726/34 |
| 2011/0252244 A1* | 10/2011 | Lesea et al. | 713/192 |
| 2011/0299678 A1* | 12/2011 | Deas et al. | 380/28 |
| 2012/0200313 A1 | 8/2012 | Kyue | |
| 2013/0019324 A1* | 1/2013 | Tehranipoor et al. | 726/34 |
| 2013/0129083 A1* | 5/2013 | Fujino | 380/29 |
| 2014/0013425 A1* | 1/2014 | Samson | 726/22 |
| 2014/0132337 A1* | 5/2014 | Yannette et al. | 327/534 |
| 2014/0167837 A1* | 6/2014 | Yannette et al. | 327/534 |

OTHER PUBLICATIONS

Hwang, et al., "AES-Based Security Coprocessor IC in 0.18-microm CMOS with Resistance to Differential Power Analysis Side Channel Attacks, Apr. 2006, IEEE Journal of Solid State Circuits, pp. 781-790."*

"Data Encryption Standard," Federal Information Processing Standards Publication (FIPS PUB) 46-2, U.S. Department of Commerce, National Institute of Standards and Technology, Dec. 30, 1993. 21 pages.

"R_Random.C—Random objects for RSAREF," RSA Data Security, Inc., created 1991, USA. 2 pages.

"Security Requirements for Cryptographic Modules," Federal Information Processing Standards Publication (FIPS PUB) 140-1, U.S. Department of Commerce, National Institute of Commerce, National Institute of Standards and Technology, Jan. 1994. 49 pages.

Bellare et al., "Incremental Cryptography: The Case of Hashing and Signing," Desmedt, Y., Advances in Cryptology-Crypto '94 Proceedings, Berlin, Springer, 1994, pp. 216-233. 18 pages.

Biham et al., "Differential Fault Analysis of Secret Key Cryptosystems," in Kaliski, B., Advances in Cryptology—CRYPTO 97, Berlin, Springer, 1997, 17th Annual International Cryptology Conference, Aug. 17-21, 1997, pp. 513-525. 14 pages.

Kocher, Paul, "Timing Attacks on Implementations of Diffie-Hellman, RSA, DSS and Other Systems," Koblitz, Advances in Cryptology—CRYPTO '96, 16th Annual International Cryptology Conference, Santa Barbara, Aug. 18-22, 1996, Proceedings of the Annual International Cryptology Conference, Berlin, Springer, DE, vol. Conf. 16, pp. 104-113, XP000626590. 10 pages.

Krawczyk et al., "HMAC: Keyed-Hashing for Message Authentication," Network Working Group Request for Comments RFC 2104, Feb. 1997. 11 pages.

Mayhew et al., "Integrated Capacitor Switchbox for Security Protection," 2012 IEEE International Symposium on Circuits and Systems (ISCAS), May 20-23, 2012, pp. 1452-1455. 4 pages.

Menezes et al., "Handbook of Applied Cryptography," CRC Press, 1996, pp. 285-298, 312-319, 452-462, 475, and 515-524, found at http://www.cacr.math.uwaterloo.ca/hac/ on Jun. 22, 2011. 45 pages.

Ryan, John, "Blinds for Thermodynamic Cipher Attacks," unpublished material on the world wide web at http://www.cypertrace.com/papers/thrmatak.html, Mar. 1996. 8 pages.

* cited by examiner

COUNTERMEASURE TO POWER ANALYSIS ATTACKS THROUGH TIME-VARYING IMPEDANCE OF POWER DELIVERY NETWORKS

RELATED APPLICATIONS

This application is related to and claims the benefit of U.S. Provisional Application No. 61/837,008 filed on Jun. 19, 2013, the entire content of which is hereby incorporated by reference herein.

BACKGROUND

Power analysis, such as simple power analysis (SPA) and differential power analysis (DPA), is a form of side channel attack in which an attacker externally observes power consumption of a cryptographic hardware device (e.g. a smart card, a set-top box, printer cartridges, etc.) to extract cryptographic keys and/or other secret information. Power consumption of microprocessors or other hardware performing cryptographic operations varies during the use of the cryptographic keys. Using SPA, the attacker can interpret power traces of electrical activity over time to determine which operations are being performed, e.g., squaring or multiplying, to compute a secret key. Using DPA, the attacker can obtain the cryptographic keys by analyzing power consumption measurements from multiple cryptographic operations performed by a vulnerable cryptographic hardware device. SPA and DPA attacks cannot generally be detected by a device, since the monitoring is normally passive, and the attack is non-invasive.

BRIEF DESCRIPTION OF THE DRAWINGS

The present embodiments are illustrated by way of example, and not of limitation, in the figures of the accompanying drawings described below.

DETAILED DESCRIPTION

Embodiments described herein provide a method and system for a countermeasure to power analysis attacks based on modifying externally observable power supply noise by varying in time the effective impedance of the power delivery network for a cryptographic device. For example, time-varying control of impedance can be implemented by either connecting or disconnecting a portion of the decoupling capacitance or inductance via a switching mechanism which is driven by a timing sequence, e.g., a random or pseudo-random binary sequence. Consequently, a significant change can be observed in the external measurement of power supply noise waveforms, thereby making the cryptographic device less vulnerable to power analysis attacks.

Figure 1:
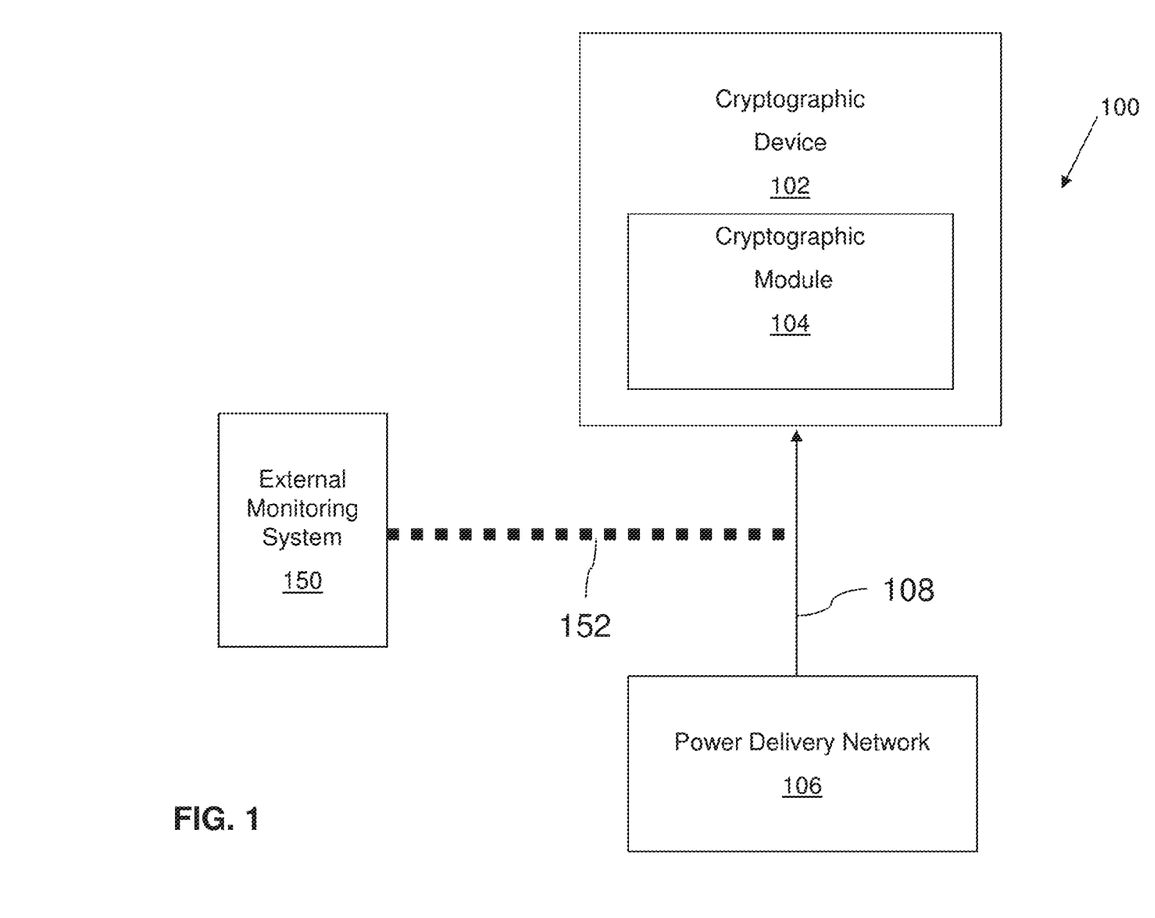
FIG. 1 is a block diagram illustrating a cryptographic device according to one embodiment.

FIG. 1 is a block diagram of a cryptographic system 100, illustrating a cryptographic device 102 including a cryptographic module 104 coupled to a power delivery network 106, where power is supplied to the cryptographic device 102 from the power delivery network 106, according to one embodiment. FIG. 1 also shows an external monitoring system 150 that can monitor power supply noise via path 152.

The cryptographic device 102 can be any device that employs encryption and/or decryption during the use of the cryptographic device 102, such as a television set top box, a smart card, a cryptographic firewall, a mobile phone, a tablet computer, a laptop computer, a desktop computer, or a printer cartridge. The cryptographic module 104 of the cryptographic device 102 can perform cryptographic algorithms for key generation, encryption, and decryption such as Data Encryption Standard (DES), Advanced Encryption Standard (AES), Elliptic Curve Cryptography, Rivest-Shamir-Adleman (RSA), etc. A secret key can be generated for use in encrypting and decrypting a message according to a particular algorithm to attempt to prevent others from determining the contents of the message, and hashing and/or signing a message to prevent others from duplicating, modifying, or counterfeiting a message.

However, execution of the algorithm requires the cryptographic module 104 to perform certain mathematical operations, and the performance of each mathematical operation consumes a certain amount of power. In other words, a waveform of a trace of the power supply noise from the power delivery network 106 along path 108 varies according to the mathematical operation being performed. For example, the amplitude of a waveform corresponding to a multiplying operation can be different from the amplitude of a waveform corresponding to a squaring operation.

The external monitoring system 150, e.g., operated by an attacker, can monitor variations in power supply noise via path 152, and gather information about power supply noise variations. Such variations can be detected by the external monitoring system 150 by, for example, using an antenna to monitor changes in the electromagnetic field near the cryptographic device 102, or by attaching probes (e.g., oscilloscope probes) to the cryptographic device. The information gathered by the external monitoring system 150 can be analyzed, e.g., by SPA or DPA, to determine the cryptographic keys used by the cryptographic device 102. For example, the attacker can use recorded power supply variations over time to determine the mathematical operations being performed and to compute the secret key being used by the cryptographic device 102. Once the attacker determines the secret key, the attacker can intercept and decrypt messages (e.g., secret messages) being sent by the cryptographic module 104 that the user or manufacturer of the cryptographic device 102 does not want others to know.

Figure 2:
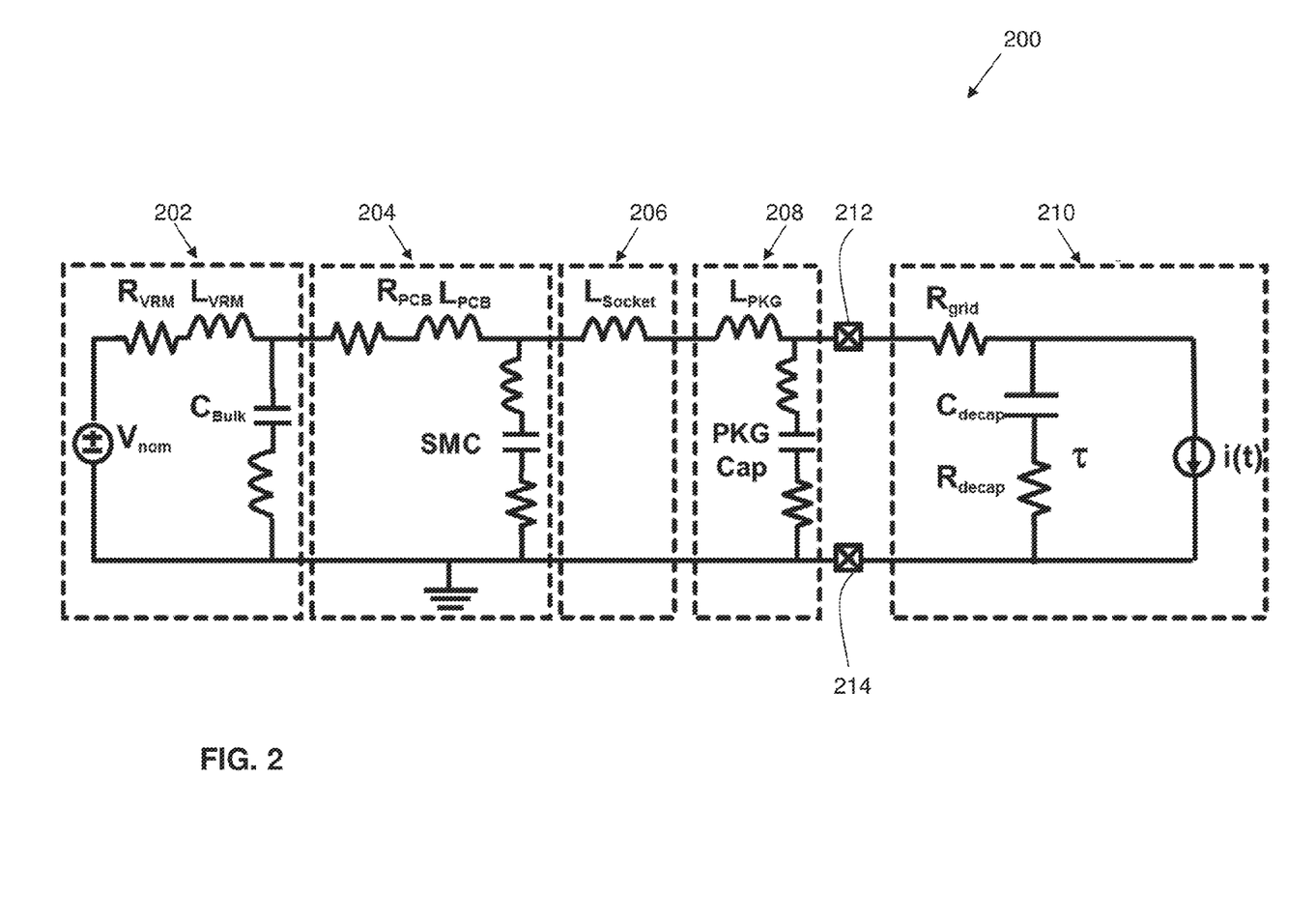
FIG. 2 is a block diagram illustrating components of a model of a power delivery network according to one embodiment.

FIG. 2 is a block diagram illustrating representative components of a model power delivery network for supplying power to a cryptographic device, according to one embodiment. Power delivery network 200 (which can be power delivery network 106 of FIG. 1) includes voltage regulator module (VRM) 202, printed circuit board (PCB) 204, socket 206, package 208, integrated circuit 210, and power supply pads 212 and 214, according to one embodiment. In other embodiments, there can be more or fewer components in the power delivery network 200.

VRM 202 includes a voltage source $V_{nom}$, a resistor $R_{vrm}$, an inductor $L_{vrm}$, and a capacitor $C_{bulk}$, in one embodiment, although other components may be present in other embodiments. VRM 202 is coupled to PCB 204, which includes resistor $R_{PCB}$, inductor $L_{PCB}$, and capacitor SMC, in one embodiment, although other components may be present in other embodiments. PCB 204 is coupled to socket 206, which includes inductor $L_{socket}$, in one embodiment, although other components may be present in other embodiments. Socket 206 is coupled to package 208, which includes inductor $L_{PKG}$ and capacitor PKG Cap in one embodiment, although other components may be present in other embodiments. Package 208 is coupled to integrated circuit 210 via power supply pads 212 and 214, where integrated circuit 210 is represented as having a resistance $R_{grid}$ and includes capacitor $C_{decap}$ with parasitic resistance $R_{decap}$ and current source i(t), although other components may be present in other embodiments.

Capacitor $C_{bulk}$, capacitor SMC (e.g., a surface mount capacitor), capacitor PKG Cap, and capacitor $C_{decap}$ provide decoupling capacitance for decoupling a portion of the power delivery network 200 to reduce power supply noise. For example, the power supply noise (i.e., variation in a power supply's voltage level) can be caused by variation in power usage by other components in the network, such as a cryptographic module during encryption or decryption of a message. Decoupling capacitors can generally provide power or shunt power quickly in response to variations in power usage (e.g., quicker than a voltage regulator), thereby reducing the amplitude of variations in waveforms of power supply noise.

Decoupling capacitors at different levels of the power delivery network 200 impact power supply noise at different frequency ranges. For example, capacitor $C_{decap}$, located on integrated circuit 210, can be the most effective decoupling capacitor, and can be most effective in reducing power supply noise from MHz frequencies to GHz frequencies. Capacitor PKG Cap, located on package 208 can be most effective in reducing power supply noise from 100 s of KHz frequencies to MHz frequencies. Capacitor SMC, located on PCB 204, can be most effective in reducing power supply noise from 10 s of KHz to 100 s of KHz. Therefore, decoupling capacitor location can be selected to optimize an effect on power supply noise, e.g., reducing the amplitude of waveforms of power supply noise.

Further, though the previous description refers to the use of decoupling capacitors to reduce or modify power supply noise, other impedance elements, such as inductors, can be used to reduce or modify power supply noise.

Figure 3A:
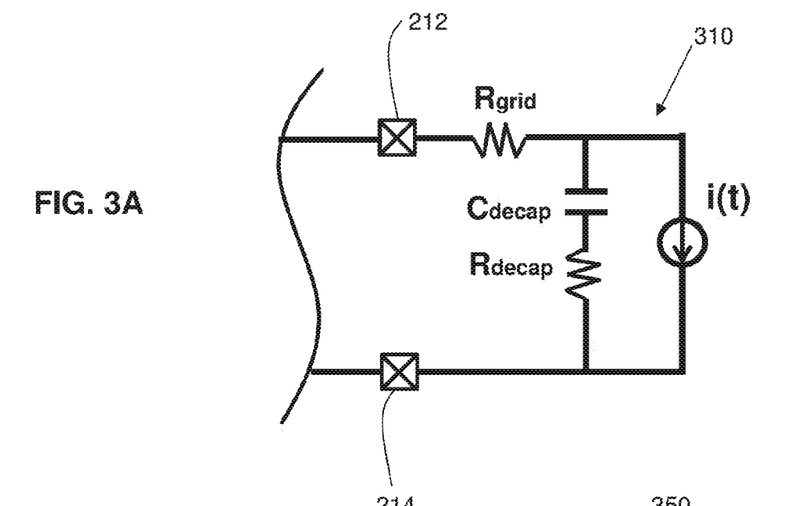
FIG. 3A is a circuit diagram illustrating a time-invariant portion of a power delivery network.

FIG. 3A is a circuit diagram illustrating a portion of a model power delivery network located on an integrated circuit that is represented as having a resistance $R_{grid}$ and includes impedance subcircuit 310, which includes a decoupling capacitor $C_{decap}$ with a parasitic resistance $R_{decap}$ and a current source i(t). These components are similarly shown in FIG. 2. The decoupling capacitor $C_{decap}$ is coupled to other portions of the power delivery network via power supply pads 212 and 214. Although impedance subcircuit 310 is described as being on an integrated circuit, impedance subcircuit 310 could also be in other locations, such as on a package or on a PCB.

Current flowing through the power delivery network charges capacitor $C_{decap}$. Capacitor $C_{decap}$ provides decoupling capacitance to the power delivery network when power demand changes by discharging to provide power when power demand increases, or by shunting excess power when power demand decreases. Further, capacitor $C_{decap}$ responds quickly to changes in power demand. By quickly providing or shunting power to balance power demand, capacitor $C_{decap}$ is able to reduce fluctuations in power supply noise by minimizing the amplitude of power supply noise waveforms.

Figure 3B:
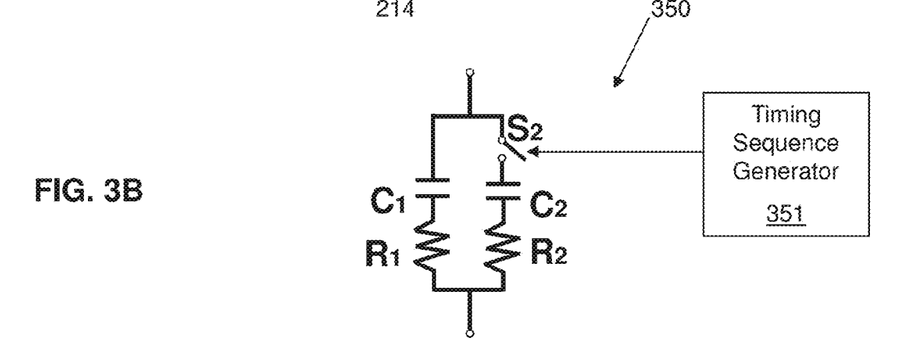
FIG. 3B is a circuit diagram illustrating a time-varying impedance subcircuit according to one embodiment.

FIG. 3B is a circuit diagram illustrating a time-varying impedance subcircuit according to one embodiment. In this embodiment, impedance subcircuit 310 of FIG. 3A, has been replaced with impedance subcircuit 350, where capacitor $C_1$, in series with resistor $R_1$, is in parallel with capacitor $C_2$, in series with resistor $R_2$ and switching element $S_2$ (e.g., a switch implemented with one or more transistors). In one embodiment, the switching element $S_2$ is coupled to a timing sequence generator 351. The components shown here are representative, and the impedance subcircuit can include more or fewer components.

Current flowing through the power delivery network charges capacitor $C_1$. Capacitor $C_1$ provides decoupling capacitance to the power delivery network when power demand changes by discharging to provide power or by shunting excess power. Therefore, the amplitude of power supply noise is reduced.

Capacitor $C_2$ is an impedance element that can be coupled or decoupled from the impedance subcircuit 350 via switching element $S_2$. However, while a capacitor is shown as the impedance element here, in one embodiment, the impedance element can be an inductor.

When the switching element $S_2$ is in a closed state, current flows through the switching element $S_2$ and, as a result, capacitor $C_2$ is also charged. Since capacitor $C_2$ is charged when switching element $S_2$ is closed, capacitor $C_2$ can also provide a decoupling capacitance effect, and changes the effective impedance seen externally by monitoring system 150.

When the switching element $S_2$ is in an open state, current does not travel through the switching element $S_2$ and, as a result, capacitor $C_2$ is not charged. Since capacitor $C_2$ is not charged when switching element $S_2$ is open, the decoupling effect of capacitor $C_2$ is removed from the power delivery network. Therefore, when switching element $S_2$ is open, the total decoupling effect of impedance subcircuit 350 is reduced as compared to when switching element $S_2$ is closed. As a result, power supply noise amplitude is increased when switching element $S_2$ is open, as compared to when switching element $S_2$ is closed.

The timing sequence generator 351 generates a timing sequence. For example, the timing sequence can be based on a random sequence, a pseudorandom binary sequence, or a sequence based on activities of the cryptographic module.

For example, a Linear Feedback Shift Register (LFSR) can be used to generate a pseudo-random sequence from an initial seed value. The initial seed value could be read from a location in memory, gathered from non-related (e.g., bus address) signals on the cryptographic device, or generated in a true random fashion from a true random number generator on the cryptographic device. The switching element $S_2$ can be operated (i.e., driven) according to the timing sequence generated by the timing sequence generator 351. In one example, the timing sequence can include a series of 1s and 0s, which can occur randomly, and the switching element $S_2$ can be opened when an element of the timing sequence is a 0 and can be closed when an element of the timing sequence is a 1, or vice versa. Since the total decoupling effect of impedance subcircuit 350 is reduced when switching element $S_2$ is open, as compared to when switching element $S_2$ is closed, the amplitude of the power supply noise is reduced when switching element $S_2$ is closed, as compared to when switching element $S_2$ is open. Furthermore, when the switching element $S_2$ is open, the phase of the power supply noise is shifted, as compared to when the switching element $S_2$ is closed. Therefore, the amplitude, and also the phase, of the power supply noise can be varied randomly or pseudo-randomly by opening and closing switching element $S_2$ according to a random or pseudorandom timing sequence.

Figure 4A:
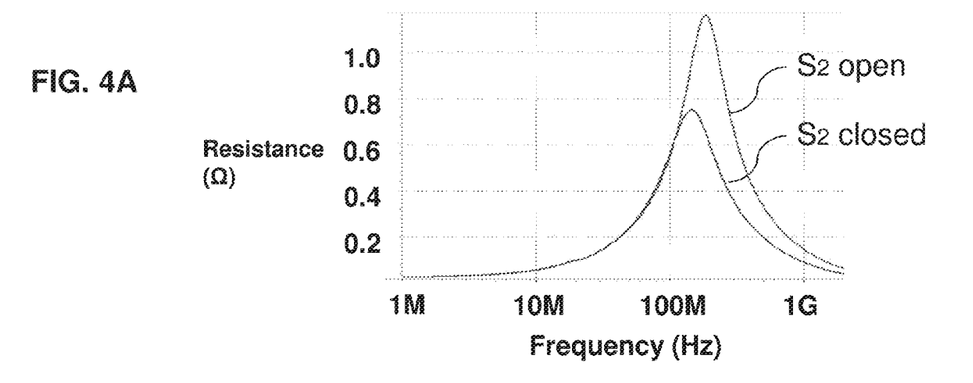
FIG. 4A is an impedance magnitude graph illustrating different magnitudes of a power delivery network over frequency due to varying an impedance element according to one embodiment.

FIG. 4A is a graph illustrating magnitude of the effective impedance over frequency for a power delivery network with switching element $S_2$ being open and switching element $S_2$ being closed (where switching element $S_2$ can be switching element $S_2$ of FIG. 3B), according to one embodiment. The magnitude of the effective impedance, and thus the power supply noise, of the power delivery network is lower when $S_2$ is closed (i.e., when $C_2$ of FIG. 3B is coupled in parallel with C1) as compared to $S_2$ is open (i.e., $C_2$ is not coupled to C1).

Figure 4B:
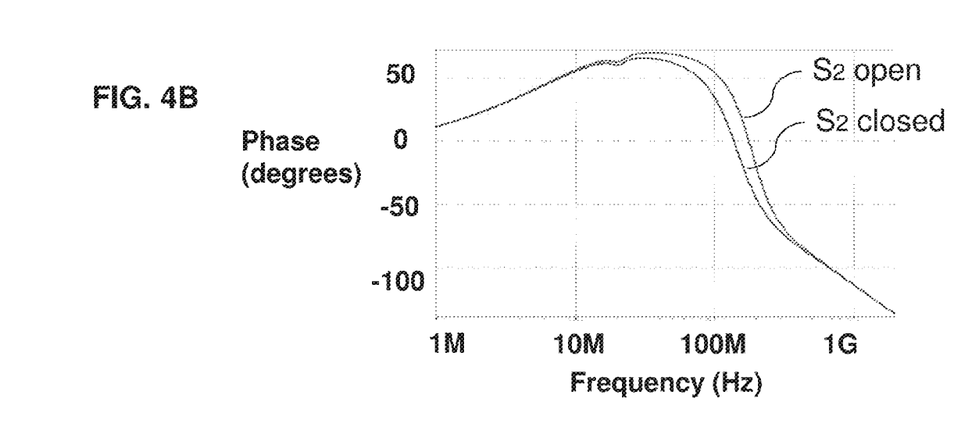
FIG. 4B is an impedance phase graph illustrating different phases of a power delivery network over frequency due to varying an impedance element according to one embodiment.

FIG. 4B is a graph illustrating phase of the effective impedance over frequency for a power delivery network with switching element $S_2$ being open and switching element $S_2$ being closed (where $S_2$ can be $S_2$ of FIG. 3B), according to one embodiment. The phase of the effective impedance, and thus the power supply noise, of the power delivery network is shifted when switching element $S_2$ is closed (i.e., when $C_2$ of FIG. 3B is coupled in parallel with C1) as compared to when switching element $S_2$ is open (i.e., $C_2$ is not coupled to C1).

Figure 5:
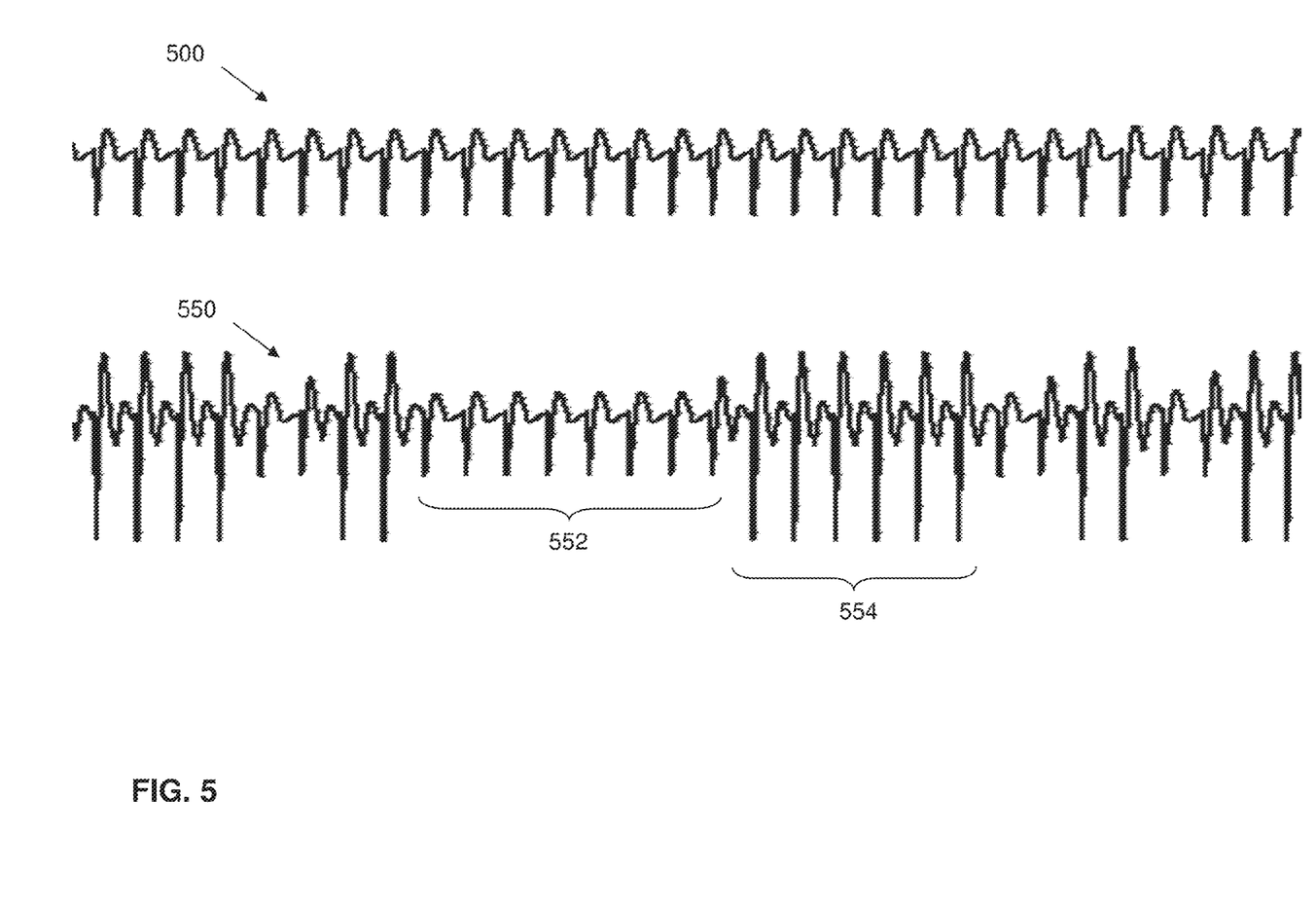
FIG. 5 is a graph illustrating externally observable power supply noise over time for a power delivery network with a time-invariant decoupling capacitor and a power delivery network with a time-varying impedance element according to one embodiment.

FIG. 5 is a graph illustrating power supply noise over time for operating power delivery networks, where power supply noise 500 is an example of power supply noise for impedance subcircuit 310 of FIG. 3A, and power supply noise 550 is an example of power supply noise for impedance subcircuit 350 of FIG. 3B.

Power supply noise 500 varies substantially uniformly over time since the impedance of impedance subcircuit 310 does not vary over time. In other words, there is no switching element present to remove the impedance subcircuit 310 at times from the power delivery network.

However, power supply noise 550 does not vary substantially uniformly. At portion 552, switching element $S_2$ is closed so that impedance subcircuit 350 produces a certain decoupling capacitance effect on the power supply noise, and, thus, the magnitude of the power supply noise is reduced. At portion 554, switching element $S_2$ is open so that a portion of the decoupling capacitance (i.e., the portion attributable to $C_2$) is removed from the total decoupling capacitance effect of impedance subcircuit 350, and, thus, the magnitude of the power supply noise is increased and the phase of the power supply is shifted, as compared to when switching element $S_2$ is closed. As a result, the shape of the noise response changes based on whether switching element $S_2$ is open or closed.

In one embodiment, by opening and closing the switching element, a portion of the decoupling capacitance of the impedance element is removed or added, respectively, to modify the power supply noise. When the switching element is opened or closed according to a random timing sequence, the power supply noise is randomly modified. When the power supply noise is randomly modified, it is difficult for an attacker with an external monitoring system to calculate the secret key by analyzing the power supply noise because it is difficult to correlate the power supply noise to mathematical operations being performed by the cryptographic module of the cryptographic device since the power supply noise varies randomly.

Figure 6:
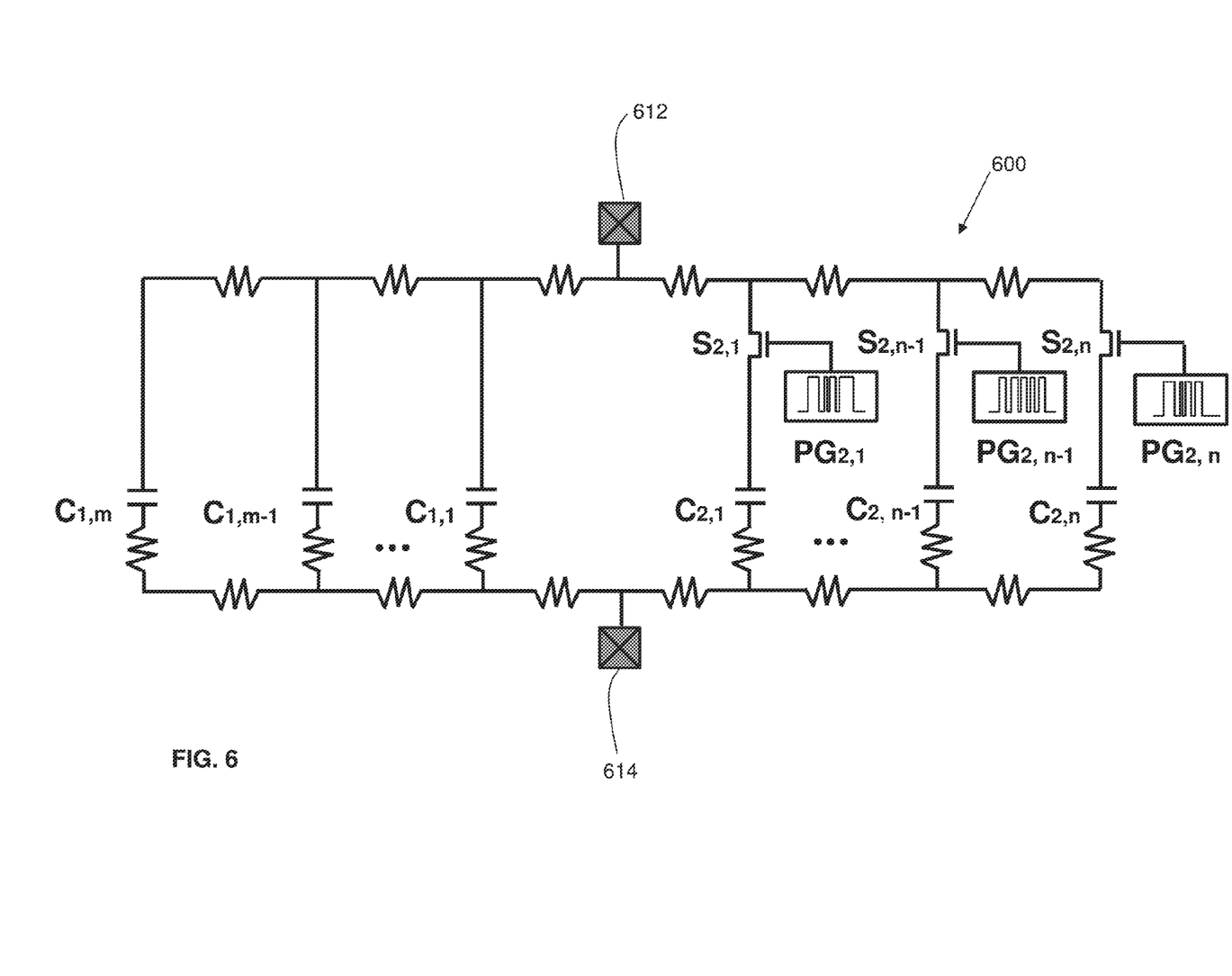
FIG. 6 is a circuit diagram illustrating a time-varying impedance subcircuit according to one embodiment.

FIG. 6 is a circuit diagram illustrating an impedance subcircuit 600 according to one embodiment. In one embodiment, impedance subcircuit 600 is on an integrated circuit, although the impedance subcircuit can also be in other locations, such as on a package or on a PCB. Capacitors $C_{1,m}$, $C_{1,\ m-1}$, $C_{1,1}$ $C_{2,1}$, $C_{2,n-1}$, and $C_{2,n}$ are coupled in parallel. Capacitor $C_{2,1}$ is coupled in series to switching element $S_{2,1}$, capacitor $C_{2,n-1}$ is coupled in series to switching element $S_{2,n-1}$, and capacitor $C_{2,n}$ is coupled in series to switching element $S_{2,n}$. Timing sequence generator $PG_{2,1}$ is coupled to switching element $S_{2,1}$, timing sequence generator $PG_{2,n-1}$ is coupled to switching element $S_{2,n-1}$, and timing sequence generator $PG_{2,m}$ is coupled to switching element $S_{2,n}$. Power supply pads 612 and 614 (e.g. can be pads 212 and 214 in FIG. 2) couple impedance subcircuit 600 to the rest of the power delivery network. Though a certain number of electrical devices are shown, more or fewer components can be included.

Capacitors $C_{1,m}$, $C_{1,\ m-1}$, and $C_{1,1}$ provide decoupling capacitance to the power delivery network that are continually present. Because capacitors $C_{2,1}$, $C_{2,n-1}$, and $C_{2,n}$ are coupled to switching elements $S_{2,1}$, $S_{2,\ n-1}$, and $S_{2,n}$, respectively, the decoupling capacitance of capacitors $C_{2,1}$, $C_{2,n-1}$, and $C_{2,n}$ can be added or removed by switching the switching elements $S_{2,1}$, $S_{2,\ n-1}$, and $S_{2,n}$ closed or open, respectively.

As similarly described above, $S_{2,1}$, $S_{2,\ n-1}$, and $S_{2,n}$ can be driven (i.e., switched closed or open) according to random or pseudorandom timing sequences generated by timing sequence generators $PG_{2,1}$, $PG_{2,n-1}$, and $PG_{2,n}$, respectively. Because the timing sequences generated by timing sequence generators $PG_{2,1}$, $PG_{2,n-1}$, and $PG_{2,n}$ are random or pseudorandom, switching elements $S_{2,1}$, $S_{2,\ n-1}$, and $S_{2,n}$ are switched open or closed at times that may be the same or may be different.

As a result of the random or pseudorandom variation in the operation of switching elements $S_{2,1}$, $S_{2,\ n-1}$, and $S_{2,n}$, the decoupling capacitance of each of the capacitors $C_{2,1}$, $C_{2,n-1}$, and $C_{2,n}$ is randomly or pseudorandomly added or removed, which leads to additional variation in power supply noise besides those from operation of the cryptographic device. For example, if only one of the switching elements is switched closed, then the amplitude and phase shift of power supply noise is greater than if two of the switching elements are switched closed. If two of the switching elements are switched closed, then the amplitude and phase shift of the power supply noise is greater than if three of the switching elements are switched closed. Here, additional variation in the power supply noise can be introduced as the switching elements are switched open and closed. Therefore, an attacker attempting to perform a power analysis attack would face even greater difficulty in attempting to correlate power supply noise of the power delivery network with operations of the cryptographic device.

Figure 7:
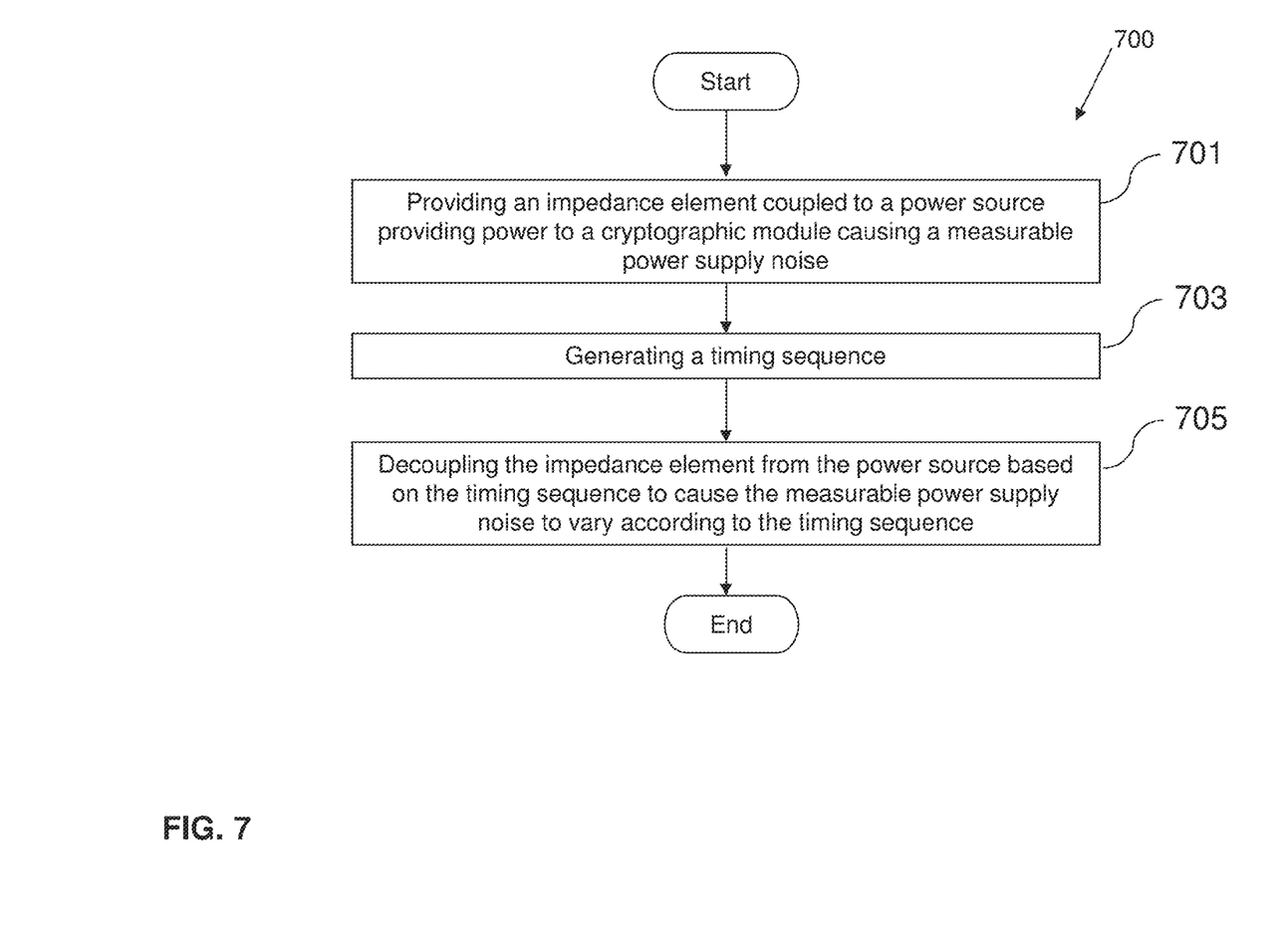
FIG. 7 is a method for a countermeasure to power analysis attacks with a time-varying impedance element according to one embodiment.
Figure 8:
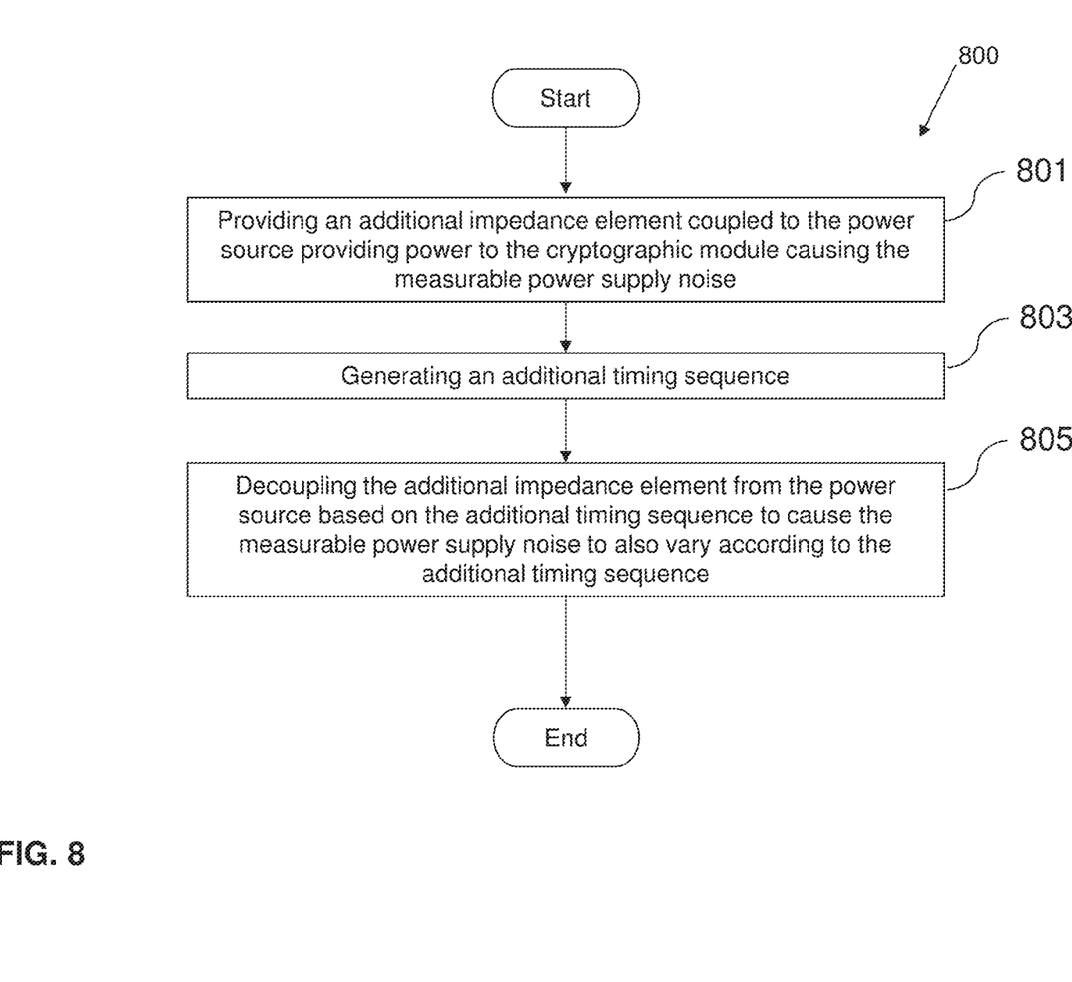
FIG. 8 is another method for a countermeasure to power analysis attacks with an additional time-varying impedance element according to one embodiment.
Figure 9:
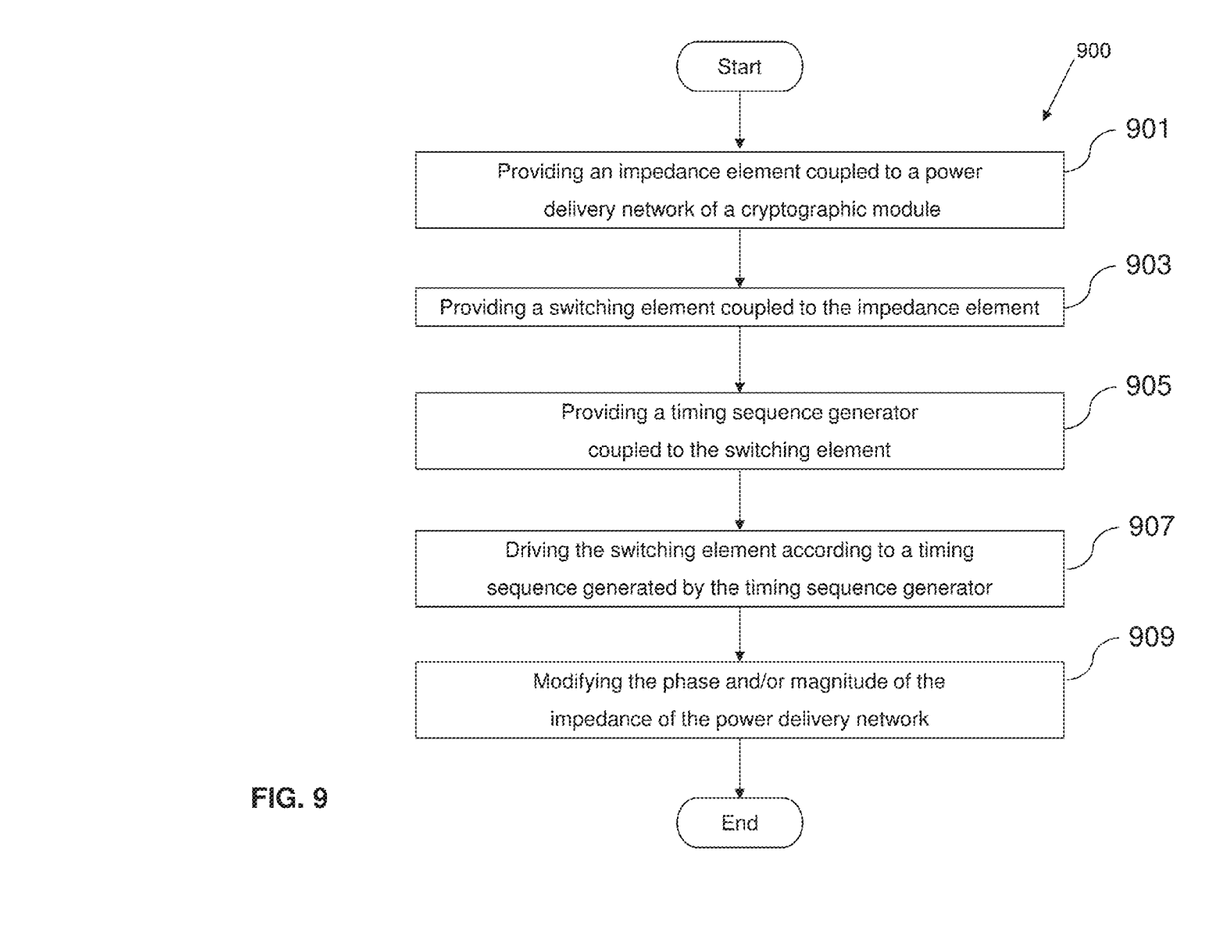
FIG. 9 is another method for a countermeasure to power analysis attacks with a switching element according to one embodiment.

FIGS. 7-9 illustrate methods for countermeasures to power analysis attacks according to embodiments. Though steps of the methods are shown in a particular order, these steps may be performed in a different order, and more or fewer steps may be performed.

FIG. 7 illustrates a method 700 for a countermeasure to power analysis attacks according to one embodiment, where an impedance element is used to vary power supply noise, according to one embodiment.

At block 701, an impedance element is provided, where the impedance element is coupled to a power source providing power to a cryptographic module causing a measurable power supply noise. For example, the impedance element can include one or more capacitors and/or one or more inductors, and the impedance element can be located on an integrated circuit, or in a different location such as on a package or a PCB. Further, the power source can be part of a power delivery network for providing power to a cryptographic device containing the cryptographic module.

In one embodiment, the impedance element has an effect on power supply noise of the power delivery network. In other words, the impedance element can modify the impedance of the power delivery network such that the power supply noise is modified. For example, the amplitude of the power supply noise is decreased and the phase of the power supply noise is shifted when the impedance element is coupled to the power delivery network, as compared to when the impedance element is not coupled to the power delivery network.

At block 703, a timing sequence is generated. For example, the timing sequence can be generated by a timing sequence generator. In one embodiment, the timing sequence is based on a pseudorandom binary sequence. In one embodiment, the timing sequence is based on a true random source. In another embodiment, the timing sequence is based on another element that provides some or all of the timing sequence. For example, at least a portion of the timing sequence can be based on a circuit with an embedded fixed pattern.

At block 705, the impedance element is decoupled from the power source based on the timing sequence to cause the measurable power supply noise to vary according to the timing sequence. In other words, the impedance element is coupled to the power source and decoupled from the power source based on an indication from the timing sequence generated by a timing sequence generator. For example, when the impedance element is decoupled from the power source, the amplitude of the power supply noise increases, and when the impedance element is coupled to the power source, the amplitude of the power supply noise decreases. Therefore, the amplitude of the power supply noise varies according to the timing sequence. Furthermore, the phase of the power supply noise can vary according to the timing sequence.

As a result of the power supply noise varying according to the timing sequence, correlating operations of the cryptographic module to power supply noise is difficult, if not impossible, to achieve. Therefore, use of method 700 provides a countermeasure to power analysis attacks because an attacker is less likely to be able to successfully use power analysis to determine a secret key or other secret information being used by the cryptographic module.

FIG. 8 illustrates a method 800 for a power analysis countermeasure according to one embodiment, where, further to method 700 of FIG. 7, an additional impedance element is used to additionally vary the power supply noise.

At block 801, an additional impedance element is provided, where the additional impedance element is coupled to the power source providing power to the cryptographic module and causing a measurable power source noise. The additional impedance element can be the same type of impedance element as the first impedance element or a different type of impedance element. The additional impedance element can be similarly located as the first impedance element (e.g., also on an integrated circuit), or the additional element can be located in a different location (e.g., on a PCB or on a package). Furthermore, more than one additional impedance element (e.g., 3 impedance elements) can be coupled to the power source.

At block 803, an additional timing sequence is generated. The additional timing sequence can be generated similarly as described above. The additional timing sequence can be generated in a same way as the first timing sequence generated or in a different way. The additional timing sequence can be generated by the timing sequence generator that generates the first timing sequence, or the additional timing sequence can be generated by a different timing sequence generator.

At block 805, the additional impedance element is decoupled from the power source based on the additional timing sequence such that the power supply noise also varies according to the additional timing sequence. In other words, the additional impedance element is coupled to the power source and decoupled from the power source based on an indication from the additional timing sequence. For example, when the additional impedance element is decoupled from the power source, the amplitude of the power supply noise increases, and when the additional impedance element is coupled to the power source, the amplitude of the power supply noise decreases. Therefore, the amplitude of the power supply noise can be further varied according to the additional timing sequence. Furthermore, the phase of the power supply noise can be further varied according to the additional timing sequence.

As a result of the power supply noise varying according to more than one timing sequence, correlating operations of the cryptographic module to power supply noise is made more difficult to achieve. Therefore, using method 800 provides a countermeasure to power analysis attacks because an attacker is even less likely to be able to successfully use power analysis to determine a secret key or other secret information being used by the cryptographic module.

FIG. 9 illustrates a method 900 for a countermeasure to power analysis attacks according to one embodiment, where a timing sequence drives a switching element to vary power supply noise.

At block 901, an impedance element is provided, where the impedance element is coupled to a power delivery network of a cryptographic module. The impedance element can be located in any suitable location for modifying an impedance of the power delivery network, such as on an integrated circuit, a PCB, or a package.

At block 903, a switching element is provided, where the switching element is coupled to the impedance element. For example, the switching element can be any suitable switching element, such as a transistor.

At block 905, a timing sequence generator coupled to the switching element is provided. For example, the timing sequence generator can be any suitable timing sequence generator, such as a random number generator or a pseudorandom number generator. In one embodiment, the timing sequence generator (e.g., a processor or a dedicated circuit) can generate a timing sequence based on a circuit with an embedded fixed pattern.

In one embodiment, the timing sequence generator can maintain a variable X, with N bits of information. At any time, some M bits of X or previous values of X (where M<=N) can be used to control the timing sequence generator. The new value of X is computed by a function F(X, Y). The function F(X, Y) can permute X in a fixed pattern, such as a linear feedback shift register, a permutation, or a linear transformation. The function F(X, Y) can also, or alternatively, take additional inputs Y, such as data from an external random or pseudorandom source, or information from cryptographic circuitry, to calculate a new value for X. The rate of updating X (i.e., computing F(X, Y) and updating the values controlling the switches) does not have to be related to the rate of operation of the integrated circuit. For example, X can be updated faster, the same, or slower than the clock running the cryptographic circuitry. However, updating X several times while a cryptographic operation is being performed by the device increases effectiveness. In one embodiment, the timing sequence can be based on activities of the cryptographic module. In one example, the module can indicate when a sensitive operation is being performed, which should be protected. In one example, different additional inputs Y may be provided to F(X, Y) such that the pattern varies differently depending on information from the cryptographic module.

At block 907, the switching element is driven according to a timing sequence generated by the timing sequence generator. For example, the timing sequence can include indications to open the switching element and indications to close the switching element. When the timing sequence indicates that the switching element should be open, the switching element is open. When the timing sequence indicates that the switching element should be closed, the switching element is closed. For example, in one embodiment where the timing sequence is random, the switching element is opened for a random amount of time (e.g., a random length period), and then the switching element is closed for a random amount of time (e.g., another random length period).

At block 909, the phase and/or magnitude of the impedance of the power delivery network are modified based on the timing sequence. In other words, the waveforms of the power supply noise of the power delivery network vary based on the timing sequence. In one embodiment, when the switching element is open, the magnitude of the effective impedance of the power delivery network is increased, as compared to the magnitude of the effective impedance of the power delivery network when the switching element is closed. Therefore, the effective impedance of the power delivery network varies according to the timing sequence which is driving the switching element.

As a result of the phase and/or magnitude of the impedance of the power delivery network varying according to the timing sequence, correlating operations of the cryptographic module to power supply noise of the power delivery network is difficult to achieve. Therefore, using method 900 provides a countermeasure to power analysis attacks because it is unlikely, if not impossible, for an attacker to be able to successfully use power analysis to determine a secret key or other secret information being used by the cryptographic module.

As those of ordinary skill in the art will appreciate, the techniques described above are not limited to particular host environments or form factors. Rather, they can be used in a wide variety of applications, including without limitation: application-specific integrated circuits (ASICs), field programmable gate arrays (FPGAs), systems on chip (SoC), microprocessors, secure processors, secure network devices, cryptographic smartcards of all kinds (including without limitation smartcards substantially compliant with ISO 7816-1, ISO 7816-2, and ISO 7816-3 ("ISO 7816-compliant smartcards")); contactless and proximity-based smartcards and cryptographic tokens (including without limitation smartcards substantially compliant with ISO 14443); stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation to programs for use on personal computers, servers, etc. and programs that can be loaded onto or embedded within cryptographic devices); key management devices; banking key management systems; secure web servers; defense systems; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; content protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCM-CIA cards; portable cryptographic tokens; and cryptographic data auditing systems.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "providing," "receiving,"

"generating," or the like, refer to the actions and processes of a computing device that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" throughout is not intended to mean the same embodiment unless described as such.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for a countermeasure to a power analysis attack, the method comprising:
   coupling a plurality of impedance elements to a pair of nodes of a power delivery network coupled between a power source and an integrated circuit, the power source providing power to a cryptographic device integrated within the integrated circuit, the cryptographic device causing a measurable power supply noise;
   generating a timing sequence based on an activity of the cryptographic device; and
   selectively decoupling one or more of the plurality of impedance elements from the pair of nodes of the power delivery network according to the timing sequence to cause the measurable power supply noise to vary according to the timing sequence when an operation of the cryptographic device is being performed, the measurable power supply noise varying based on a number of the one or more of the plurality of impedance elements that are selectively decoupled according to the timing sequence.

2. The method of claim 1, wherein the selectively decoupling the one or more of the impedance elements comprises selectively decoupling the one or more impedance elements using a switching element that switches according to the timing sequence.

3. The method of claim 2, wherein the switching element comprises a transistor.

4. The method of claim 1, wherein the one or more impedance elements are located on at least one of the integrated circuit coupled to the power source, in a package coupled to the power source, or on a printed circuit board coupled to the power source.

5. The method of claim 1 further comprising:
   coupling an additional impedance element coupled to the pair of nodes of the power delivery networked coupled between the power source and the integrated circuit;
   generating an additional timing sequence; and
   selectively decoupling the additional impedance element from the pair of nodes of the power delivery network according to the additional timing sequence to cause the measurable power supply noise to further vary according to the additional timing sequence.

6. The method of claim 1, wherein the timing sequence is further based on a sequence from a random number generator, which is independent of activities of the cryptographic device.

7. The method of claim 1, wherein the one or more impedance elements comprises a capacitor or an inductor.

8. The method of claim 1, wherein the power supply noise varies in amplitude and phase according to the timing sequence.

9. The method of claim 1, wherein the generating of the timing sequence is further based on a value that is updated a plurality of times while the operation of the cryptographic device is being performed.

10. The method of claim 1, wherein an amplitude associated with the measurable power supply noise decreases when the number of the one or more of the plurality of impedance elements that are selectively decoupled according to the timing sequence increases.

11. A system for a countermeasure to a power analysis attack, the system comprising:
   an integrated circuit comprising cryptographic circuitry;
   a pair of power supply pads coupled to the integrated circuit and configured to supply power to the integrated circuit from a power source;
   a portion of a power delivery network disposed on the integrated circuit, the portion of the power delivery network is coupled to the pair of power supply pads, wherein the portion comprises components to provide or shunt power in response to changes in power demand of the integrated circuit, wherein the cryptographic circuitry causes a measurable power supply noise;
   a time-varying impedance subcircuit selectively coupled to and decoupled from the portion of the delivery network, the time-varying impedance subcircuit comprises:
      a plurality of impedance elements configured to be coupled to and decoupled from the pair of power supply pads when providing power to the cryptographic circuitry that causes the measurable power supply noise;
      a plurality of switching elements coupled to the plurality of impedance elements; and a timing sequence generator circuit coupled to the plurality of switching elements, the timing sequence generator circuit to generate a timing sequence based on an activity of the cryptographic circuitry, wherein one or more of the impedance elements are decoupled from the pair of power supply pads via one or more of the plurality of switching elements based on the timing sequence to cause the measurable power supply noise to vary according to the timing sequence when an operation of the cryptographic circuitry is being performed, the measurable power supply noise varying based on a number of the one or more of the plurality of impedance elements that are selectively decoupled via the one or more of the plurality of switching elements based on the timing sequence.

12. The system of claim 11 further comprising:
an additional impedance element configured to be coupled to the power source; and
an additional timing sequence generator circuit to generate an additional timing sequence, wherein the additional impedance element is selectively decoupled from the power source based on the additional timing sequence to cause the measurable power supply noise to further vary according to the additional timing sequence.

13. The system of claim 11, wherein the timing sequence is further based on a sequence from a random number generator circuit, which is independent of activities of the cryptographic circuitry.

14. The system of claim 11, wherein each of the impedance elements comprises a capacitor or an inductor.

15. The system of claim 11, wherein the portion of the power delivery network comprises a decoupling capacitor coupled between the pair of power supply pads, a decoupling resistor coupled in series with the decoupling capacitor, and a current source coupled in parallel between the pair of power supply pads, and wherein the time-varying impedance subcircuit is selectively coupled to and decoupled from the pair of power supply pads in parallel with the decoupling capacitor.

16. The system of claim 15, wherein the portion of the power delivery network is to provide additional power to the integrated circuit when power demand of the integrated circuit increases or to shunt excess power from the integrated circuit when the power demand of the integrated circuit decreases, and wherein the time-varying impedance subcircuit is to vary the power of the power delivery network to vary the measurable power supply noise according to the timing sequence.

17. The system of claim 15, wherein the portion of the power delivery network is to increase or decrease the power supplied to the integrated circuit, and wherein the time-varying impedance subcircuit is to vary the measurable power supply noise on the power supplied to the integrated circuit.

18. The system of claim 15, wherein the decoupling capacitor is to respond to changes in power demand of the integrated circuit by providing additional power or shunting excess power to reduce an amplitude of the power supply noise, and wherein the time-varying impedance subcircuit is to vary the amplitude, a phase, or both of the power supplied to the integrated circuit.

19. An apparatus comprising:
a portion of a power delivery network coupled to a power supply during operation;
a cryptographic device comprising a cryptographic circuit to execute a cryptographic operation, wherein the cryptographic circuit is powered by power supplied to the cryptographic device via the portion of the power delivery network and the cryptographic circuit causes a measurable power supply noise during operation;
a plurality of switching components controlled via a random timing sequence that is based on an activity of the cryptographic circuit; and
a plurality of impedance elements, wherein one or more of the plurality of impedance elements are selectively coupled to the portion of the power delivery network using the plurality of switching components according to the random timing sequence to randomly vary impedance of the power delivery network to randomly vary the measurable power supply noise when the cryptographic operation of the cryptographic circuit is being performed, the measurable power supply noise varying based on a number of the one or more of the plurality of impedance elements that are selectively coupled to the portion of the power delivery network using the plurality of switching components according to the random timing sequence.

20. The apparatus of claim 19 further comprising
a timing sequence generator component coupled to the plurality of switching components and to generate the random timing sequence, wherein the plurality of impedance elements are configured to be selectively coupled to the power delivery network using the plurality of switching components according to the random timing sequence.

* * * * *